United States Patent
Bizal et al.

(10) Patent No.: US 9,737,170 B2
(45) Date of Patent: Aug. 22, 2017

(54) WIDE FLANGED FRYING/COOKING DEVICE WITH STAND AND SAFETY PLATE

(75) Inventors: Michael John Bizal, Fridley, MN (US); John Joseph Egart, Andover, MN (US)

(73) Assignee: Fryin' Saucer, Inc., Fridley, MN (US)

( * ) Notice: Subject to any disclaimer, the term of this patent is extended or adjusted under 35 U.S.C. 154(b) by 829 days.

(21) Appl. No.: 12/653,147

(22) Filed: Dec. 9, 2009

(65) Prior Publication Data
US 2010/0175563 A1    Jul. 15, 2010

Related U.S. Application Data

(60) Provisional application No. 61/203,072, filed on Dec. 18, 2008.

(51) Int. Cl.
*A47J 37/12* (2006.01)
*A47J 36/26* (2006.01)

(52) U.S. Cl.
CPC .................................. *A47J 36/26* (2013.01)

(58) Field of Classification Search
USPC .......... 99/410–418, 9 R, 449, 422, 403, 425; 108/153.1–158.13; 126/33, 260, 40; D7/40, 407, 402–404, 409, 533.6; 426/243
See application file for complete search history.

(56) References Cited

U.S. PATENT DOCUMENTS

| | | | | |
|---|---|---|---|---|
| 836,983 A * | 11/1906 | Millwee | ................. | A47J 37/10 16/111.1 |
| 1,169,560 A * | 1/1916 | Murray | ..................... | F24C 5/20 126/43 |
| 1,431,696 A * | 10/1922 | Shankland | .............. | F24C 15/10 126/215 |
| 1,622,587 A * | 3/1927 | Housel | .................... | F24C 15/10 126/215 |
| 1,732,910 A * | 10/1929 | Possons | ................... | A47J 37/10 99/425 |
| 1,733,450 A * | 10/1929 | Detwiler | .................. | A47J 37/10 126/390.1 |
| 1,936,551 A * | 11/1933 | Garrison | .................. | A47J 37/10 99/339 |
| 2,012,520 A * | 8/1935 | Rogers | .................. | A47J 37/067 126/41 R |
| 2,262,302 A * | 11/1941 | Sinclair | .................... | A47J 37/10 99/425 |
| 2,328,978 A * | 9/1943 | Hennessy | ............. | A47J 37/067 99/425 |
| 2,787,995 A * | 4/1957 | Alter | .................... | A47J 37/0763 126/25 R |
| 3,025,849 A * | 3/1962 | Zimmerman | ............. | F24C 1/16 126/25 A |
| 3,038,402 A * | 6/1962 | Singer | ..................... | A47J 36/06 126/43 |
| 3,079,855 A * | 3/1963 | Valis | ...................... | A47J 37/067 99/339 |
| 3,427,957 A * | 2/1969 | O'Reilly | ............... | A47J 37/108 99/425 |

(Continued)

*Primary Examiner* — Gene Kim
*Assistant Examiner* — Matthew B Stanczak
(74) *Attorney, Agent, or Firm* — Merchant & Gould P.C.

(57) ABSTRACT

A cooking structure with unique abilities of frying, staging, draining and warming foods. This cooking device comprises an oil reservoir, a staging/draining flange, and a warming flange.

19 Claims, 14 Drawing Sheets

(56) References Cited

U.S. PATENT DOCUMENTS

| | | | | |
|---|---|---|---|---|
| 3,469,524 A * | 9/1969 | Trozzolo | ............... | A47J 37/10 126/390.1 |
| 3,759,164 A * | 9/1973 | Robinson | ............ | A47J 37/1242 126/215 |
| D229,824 S * | 1/1974 | Erickson | ....................... | D9/434 |
| 3,785,274 A * | 1/1974 | Yamamoto | ............. | A47J 37/10 126/390.1 |
| 3,847,068 A * | 11/1974 | Beer | ....................... | A47J 37/10 126/390.1 |
| 3,877,458 A * | 4/1975 | Allander | ................... | F24C 3/14 126/38 |
| 3,960,134 A * | 6/1976 | Scott | ....................... | F24C 15/36 126/24 |
| D245,663 S * | 9/1977 | Gordon | .......................... | D7/407 |
| 4,134,385 A * | 1/1979 | Barter | ....................... | A47J 36/30 126/38 |
| 4,192,284 A * | 3/1980 | Vache | ....................... | F24C 3/14 126/29 |
| D264,928 S * | 6/1982 | DiFede | .......................... | D7/403 |
| 4,385,619 A * | 5/1983 | Casinelli | ..................... | F24C 1/16 108/127 |
| 4,530,345 A * | 7/1985 | Christiansen | ........... | F24C 3/085 126/260 |
| 4,574,777 A * | 3/1986 | Bohl | ....................... | A47J 37/10 126/390.1 |
| D288,891 S * | 3/1987 | Saito | ........................ | D7/391 |
| 4,666,727 A * | 5/1987 | Wang | .................... | A47J 27/002 126/390.1 |
| 4,704,955 A * | 11/1987 | Archibald | ........... | A47J 37/0682 99/339 |
| 4,726,350 A * | 2/1988 | Steinhauser | .............. | F24C 3/14 126/214 D |
| D296,861 S * | 7/1988 | Fielding | ........................ | D7/402 |
| 5,065,735 A * | 11/1991 | Bourgeois | ............... | F24C 15/10 126/30 |
| 5,117,808 A * | 6/1992 | Peters | ....................... | F24C 3/14 126/25 R |
| D364,534 S * | 11/1995 | Brown | .......................... | D7/407 |
| 5,511,466 A * | 4/1996 | Dzibinski | ............. | A47J 37/101 126/385.1 |
| D376,315 S * | 12/1996 | Gumowitz | ...................... | D7/354 |
| 6,102,027 A * | 8/2000 | Tilby | ....................... | F24C 3/14 126/38 |
| 6,223,738 B1 * | 5/2001 | Wu | ........................ | F24C 3/103 126/38 |
| D458,804 S * | 6/2002 | Reames | .......................... | D7/409 |
| 6,446,544 B1 * | 9/2002 | Creighton | ............... | A47J 37/10 99/339 |
| D469,656 S * | 2/2003 | Vollmer | ........................ | D7/391 |
| 6,526,875 B1 * | 3/2003 | Dzbinski | ................. | A47J 36/20 126/369 |
| 6,918,563 B2 * | 7/2005 | Tseng | ..................... | F16M 11/38 108/116 |
| 6,978,777 B2 * | 12/2005 | Pestrue | .................. | F24C 15/10 126/25 AA |
| 7,086,552 B2 * | 8/2006 | Zepter | ................... | A47J 27/002 220/573.4 |
| D545,124 S * | 6/2007 | Hawkins | ....................... | D7/409 |
| D648,979 S * | 11/2011 | Schroeder | ...................... | D7/354 |
| 8,869,681 B2 * | 10/2014 | Schroeder | ............... | A47J 36/00 99/425 |
| 2002/0083846 A1 * | 7/2002 | Creighton | ............... | A47J 37/10 99/426 |
| 2005/0109330 A1 * | 5/2005 | Pestrue | .................. | F24C 15/10 126/25 R |
| 2006/0011072 A1 * | 1/2006 | Giornali | ................. | A47J 37/10 99/422 |
| 2012/0006208 A1 * | 1/2012 | Schroeder | ............... | A47J 37/10 99/422 |
| 2012/0237647 A1 * | 9/2012 | Dobert | ................ | A47J 37/0682 426/243 |

* cited by examiner

WIDE FLANGED FRYING/COOKING DEVICE WITH STAND AND SAFETY PLATE

CROSS-REFERENCE TO RELATED APPLICATIONS

This application claims the benefit of U.S. Provisional Application Ser. No. 61/203,072, filed Dec. 18, 2008.

FIELD OF THE INVENTION

The present invention generally relates to a cooking device with stand and safety plate accessory plate, that is large enough to deep fry, fly and steam foods such as fish, poultry, vegetables and seafood and allow these foods to continue to cook and drain and remain hot on the wide outer-flange of the cooking device, with the cooking device having the ability to be retrofitted to existing burner stands in a safe manner.

BACKGROUND OF THE INVENTION

In recent years, popularity has grown with regard to the method of preparing foods by frying. While frying has always been a popular method of preparing and enjoying food, it is only in recent years that flying outdoors has gained in great popularity with the general public. While many fryers are usable they fail to provide the versatility requested by the general public.

While providing a method of preparation and overall more moist and flavorful meal, the deep frying and frying process has often proven to require several cooking devices and many flying kitchen tools, which tends to be time and labor intensive. Although previous deep flying inventions are somewhat common, most known designs fail to use minimal oil, and fail to put the emphasis of cooking on a combination of the oil reservoir and a standby hot cooking area with a simple gravity oil drain system.

Outdoor and Indoor deep fryers have been made in many different configurations, but generally use a large amount of oil, a large pot and a drain basket. These previous designs require a long time for set up and take down of the cooking device. The cooking devices and all their accessories and oil, are often times cumbersome and difficult to transport in and outdoors. These characteristics reveal several flaws that our device corrects and improves. Other common cooking configurations are flying food using flat type griddle or flying pans.

Prior inventions fail to keep the food at serving temperature while other foods are being prepared. Most inventions fail to provide a complimentary cooking function oil flying/ steaming and frying as part of the invention, therefore decreasing the usefulness of the unit overall. Our device addresses these food preparation issues Many flying pans and deep fryers can be hazardous because they are not secured to the stand or burner, thus decreasing the overall safety of the unit. Our device adequately addresses the safety concerns for cooking and adaptability with other cooking stand/burners.

In short, the prior art has failed to adequately address all the concerns and needs of the general public in this field.

SUMMARY OF THE INVENTION

For consideration for patent is our cooking device and stands with safety structures by which food can be deep fried, steamed or fried by means of gas fired or electric heat source, in several cooking stages in a safe environment. An oil reservoir centered in the middle lower section of the device is used as the primary fryer/deep flyer or steamer. When the food is cooked it is removed and placed on a wide outer-flange to further cook, drain and remain hot before serving. This device is primarily intended to be used with the table top stand or the stand up stand, both stands are quick breakdown, collapsible and adapted specifically for the cooking device.

The device can also be used in conjunction with existing outdoor gas fired stands and burners with the safety plate attachment. This device is easy to assemble, uses minimal oil and can be transported, cleaned, and stored easily. In addition to using the age old technology of cooking with oil and frying food directly on the metal drain flange there are many important details of this device and its' accessories that are new and proprietary. Described herein is the detail of our device.

The existing flying and deep frying community provides a baseline for some of the requirements for our device. Our version takes a sensible approach to flying/steaming and deep flying food in oil as the first phase, and placing food on the outer-flange cooking area in a second phase which also acts as a natural oil and fat drain.

The center oil reservoir can range in size anywhere from 5-12 inches wide and 1 to 5 inches deep. The wide outer-flange design is unique and long lasting due to the simplicity of the design and non moving parts. This outer-flange area is designed as a drain/cooking/standby warming flange can range in size from 4-12 inches wide. The outermost flange from the center oil reservoir is perpendicular to the ground and is the outer vertical flange 23 (FIGS. 2, 3A, 12, 18) which acts as a heat barrier to hold in the heat from the gas or electric heat source. In traditional cooking devices the heat quickly escapes around the pan and out to the atmosphere. Our device captures and contains the heat to further heat the outer cooking flange which enables the cooking flange to cook and keep food hot. The natural gravity pitch of the outer-flange has an angle in the horizontal cooking surface that allows the excess oil to flow back into the reservoir. The overall diameter of the cooking device can vary from 10 inches to 60 inches. The depth of the cooking device can vary from 1 to 15 inches. The said cooking device is constructed utilizing a unitary metal structure process to shape or forge a metal, preferably aluminum or steel, of sufficient thickness to support the weight of the food item being cooked. This weight calculation should also take into account the increased weight of the food item upon absorption of liquids or oils which is commonly the result of the flying process. The said cooking device is designed in a round circular shape but can be designed with any circumference shape; square, octagonal, triangular, wave or irregular, etc. that allows for the cooking flange and drain pitch angle to slope into the oil/cooking reservoir.

Outdoor and Indoor deep fryers have been made in many different configurations, but generally use a large amount of oil, a large pot and a drain basket, with a fixed stand. This reveals several flaws that our version corrects and improves. Our version takes the path of frying/steaming and deep frying food in minimal oil and using the gravity drain flange to drain off the excess oil and further cook the food after the deep frying process.

The device is assembled and used in conjunction with a gas burner or electric heating element. This device is of very simple construction and assembles and disassembles quickly for efficient indoor/outdoor and backyard use. Currently, the only available way to cook food while in the outdoors or in the backyard is to use large cumbersome deep flyers, pans, or griddles with cooking stands and burners that are complicated to set up, require tools, and are awkward to maneuver. These devices often are used to cook food directly in a traditional pan bathed in oil. This requires a large amount of storage space for deep flyers, burners, baskets and large amounts of oil. The benefit to the said cooking device with collapsible stand is a flat profile that takes up very little space and is easy to transport and store. The said stand for the cooking device has quick release and collapsible legs that act as the said cooking device's positioning and stabilizing arms. These support arms lock the cooking device in position and prevent any accidental overturning of the said cooking device. Thus locking the accompanying stand to the said cooking device with quick release and collapsible safety legs serves several purposes. First it enables quick assembly and disassembly of the device and second it acts as a safety mechanism to help prevent and minimize harm. The stand up version of the said cooking device utilizes quick release, collapsible legs with circular frame ring that supports cooking device on perimeter. These devices are easy to put together, cook and transport offering advantages over previous designs. The said cooking devices are compatible with a circular stand base in which the cooking device sits directly on top of the stand frame and creates a very secure connection between the cooking device and the cooking device frame.

Often times, prior to consuming food, the food must have the oil removed after the flying and deep flying food in a traditional deep fryer or pan. This is done in many different methods but the most common is to use paper towels or napkins to "soak up" the oil from the cooked food. During this process the food often times gets "stacked up" or "piled up" during the "soaking" process and cools off thus losing the "hot" taste of fresh cooked food. The said device solves these problems by virtue of the design itself. When the food is fried to the liking, the food is removed from the oil reservoir by use of simple kitchen tools, tongs, fork, spoon, etc., and placed on the hot cooking flange. When the food is placed on the outer-flange the food continues to stay hot and continues cooking due to the radiant heat that migrates up through the oil reservoir to the cooking flange by means of the metal constructed uni-frame. The 2.sup.nd main advantage of the outer drain flange is that the oil naturally drains from the food and rolls back into the center oil reservoir. The obvious advantages are the time saved in removing oil from food, and the unnecessary need for a drain basket by using a single device for cooking and draining food. The intangible advantages are the health benefits from not consuming as much oil and fat in their diet.

Often times the general public will attempt to perform oil cooking when surrounding circumstances are not favorable for safety. Large amounts of hot oil are carelessly handled because the oil cooking device does not have adequate safety connections. This increases the danger of accidents. The said cooking device has safety connections and flange connections on table top version and stand up version, that "lock" the said cooking device to the said stand by means of mechanical compression connection or locking screws. The designed stands, collapsible and quick breakdown, for the said cooking device alleviates any safety concerns for the said cooking device tipping over or spilling hot oil.

The fact that many people currently own an outdoor gas or electric stand and burner used for cooking seafood and turkeys, etc., led us to create a safety plate that will safely connect the wide flanged cooking device to various stands and burners in the market today. It is logical for someone to use an existing gas or electric stand and burner with our device rather than buy another stand that performs the same function. Thus, we have designed a safety plate that will prevent the cooking device from inadvertently being knocked over when in use with a stand and burner that are made by a different manufacturer.

Because this device can be used in conjunction with many different types of outdoor gas burners currently in use, we designed a "retrofit" safety plate that attaches to most of the gas fired stands and burners in the market. This device can be a unitary metal structure or separate pieced structure welded or screwed together that encompasses sliding adjustable tightening bars that are designed to tighten and lock around existing gas and electric burner stands. This makes a safe and secure connection of the safety plate to the existing stand and burner. The safety plate includes a circular opening slightly wider in diameter than the oil reservoir which is designed to accept the oil reservoir and cradle the flat plate cooking device. This opening can be anywhere from 5-15 inches. The said safety plate includes metal support arms which stabilize the underside of the said flat plate cooking device. These support arms extend to the outside diameter of the flat plate cooking device and are spaced for even weight distribution of the said cooking device.

The safety cooking plate has sliding, adjustable securing stops that can be adjusted and secured to a specific stand and burner by means of set screws that tighten the securing stops of the safety plate to the existing stand and burner. Thus the safety plate is firmly secured to the gas or electric stand and burner.

The Flat Plate Cooking device is then laid on top of the safety device in which the said cooking device oil reservoir sits perfectly in the opening of the safety plate. This male of the said cooking device and female of the safety plate connection provide a firm stable cooking platform.

The final and necessary safety connection is the connection of the safety plate arms to the said cooking device. This is accomplished by means of quick connection set screws that fasten the outside vertical flange 23 (FIGS. 2, 3, 12, 18) to the inner safety plate arms. This connection can also be made the same by a quick connect locking device. Securing the screws or quick connects of the safety plate to the said cooking device makes the safety plate cooking device connection complete.

The burner, control arm and regulator assembly is unique in that the regulator is placed next to the control knob and will never become too hot and dangerous because it is a safe distance away from the burner.

BRIEF DESCRIPTION OF DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF DRAWINGS

Figure 1:
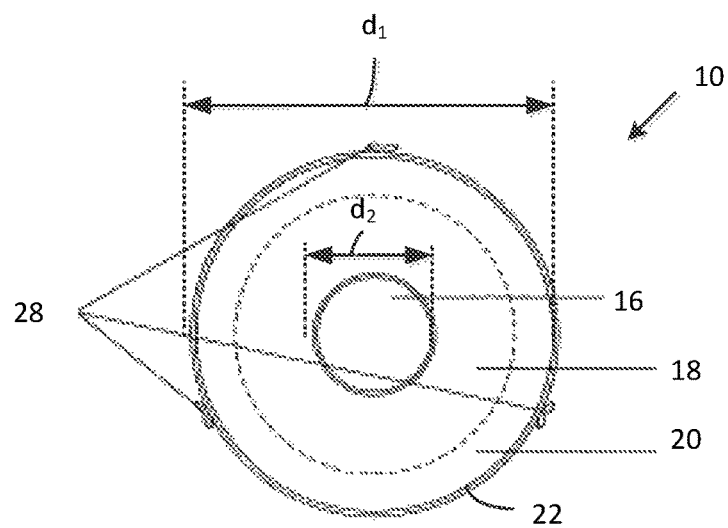
FIG. 1 is a top view perspective of the said cooking device.
Figure 2:
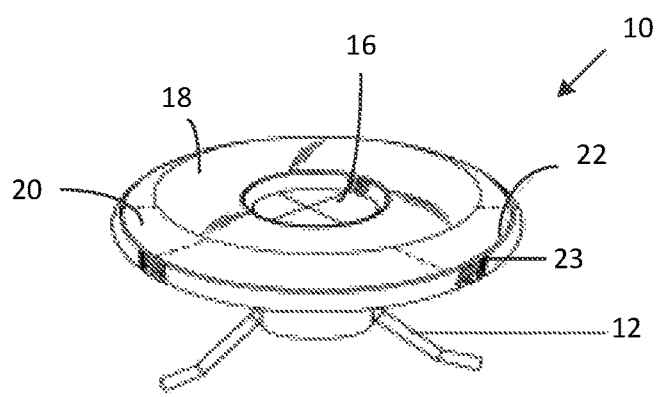
FIG. 2 is an angled perspective front/top view of FIG. 1.
Figure 3A:
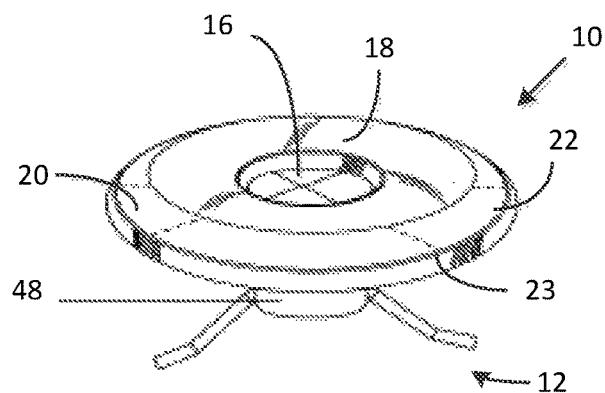
FIG. 3A is a perspective front/top view of FIG. 1 with more of the said cooking device stand visible.

FIGS. 1, 2, and 3A illustrate the current invention, a cooking device 10 used for flying, heating, and toasting foods and comprising an exterior safety stand 12 as shown in FIGS. 1-5 and an integrated safety plate 14 as shown in FIGS. 6-12.

FIGS. 1-3 illustrate the said cooking device 10 having an approximate diameter $d_1$ of 12-36 inches with an oil reservoir 16 of approximately 4-10 inches in diameter ($d_2$) in the center of the cooking device, with the oil reservoir 16 having a depth of approximately 1-4.5 inches. This reservoir is of sufficient size to accommodate approximately 12-60 oz of oil used for flying/deep frying. The said device has a drain flange 18 of approximately 2-7 inches ($w_1$) that encircles the oil reservoir. The drain flange 18 is used as a platform for placing food after the frying process. The drain flange 18 acts as a food positioning holding/draining area, by which the cooked food has a chance to drain off the excess oil which by gravity flows back into the oil reservoir 16. The angle of the drain is enough to allow the oil to flow into the oil reservoir by means of gravity and still hold the food in cooking position on the flange.

The furthest diameter area from the oil reservoir, approximately 1-4 inches in width ($w_2$), encompassing the full circumference of the cooking device is the outside flange or holding area 20. This area is flat with a 1%-2% slight pitched angle toward the oil reservoir 16. Not intended to drain oil back into the reservoir 16, this angle is intended only to prevent oil from dripping off the outer edge 22 of the cooking device 10. This holding area 20 is intended to hold food and keep food hot after the cooking process. This area of the cooking device is often used to toast and warm and fry food items.

Figure 3B:
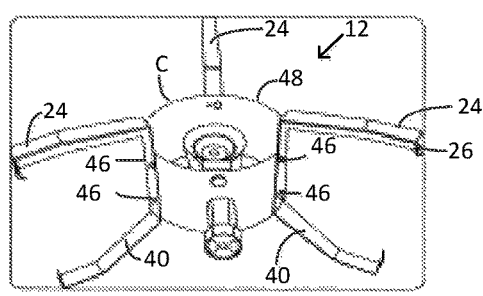
FIG. 3B is a perspective view of the stand portion of the cooking device shown in FIG. 3A.
Figure 4:
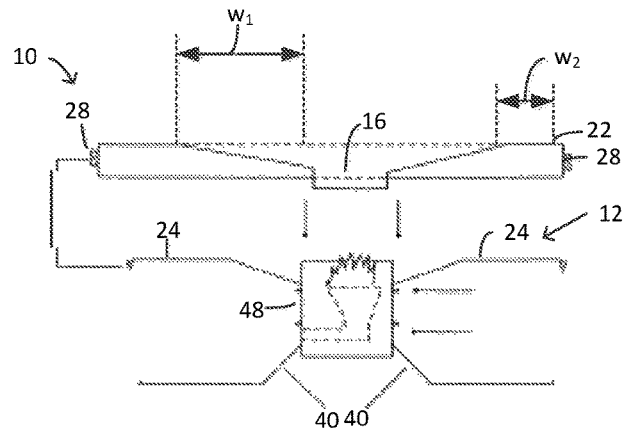
FIG. 4 is a schematic cross section of said cooking device with stand showing how the cooking device engages the stand and burner.
Figure 5:
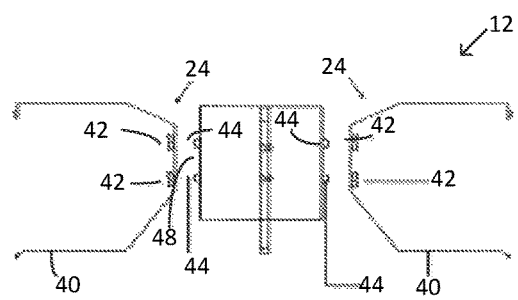
FIG. 5 is a schematic side view of the said cooking device stand with removable legs.
Figure 6:
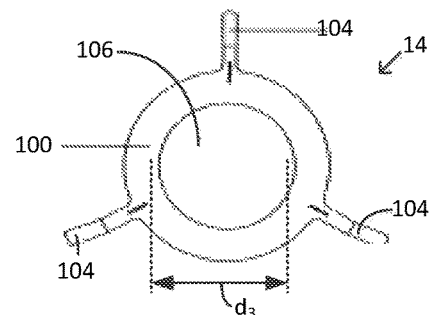
FIG. 6 is a top perspective view of the said safety stand.
Figure 7:
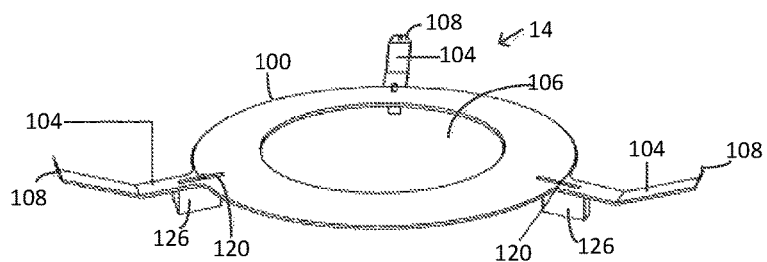
FIG. 7 is a front perspective view the safety stand plate.
Figure 8:
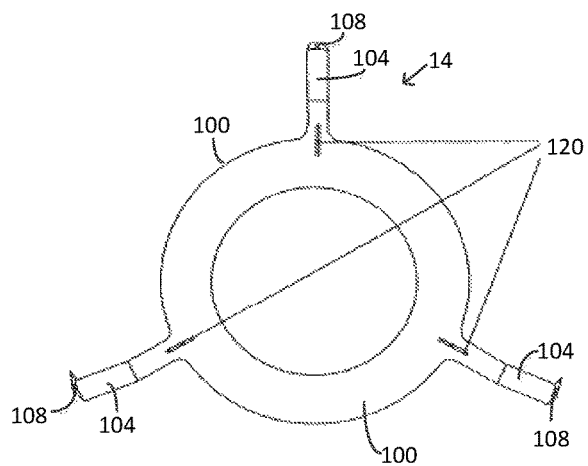
FIG. 8 is a bottom view of the safety stand plate in FIG. 7.
Figure 9A:
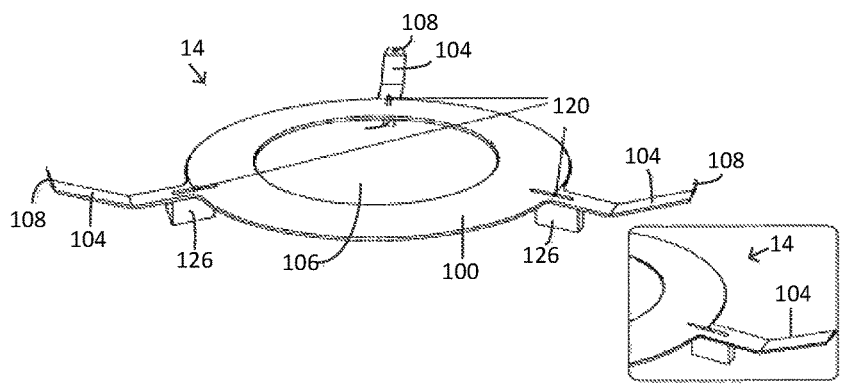
FIG. 9A is a front/top perspective of the safety stand plate.
Figure 9B:
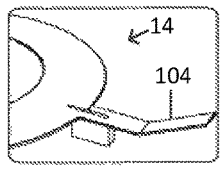
FIG. 9B is a front/top view of an adjustable safety bracing portion of the safety stand plate of FIG. 9A.
Figure 9C:
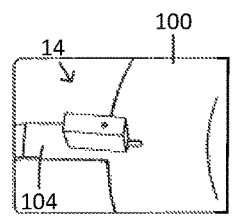
FIG. 9C is a front/bottom view of the adjustable safety bracing portion of FIG. 9B.
Figure 18:
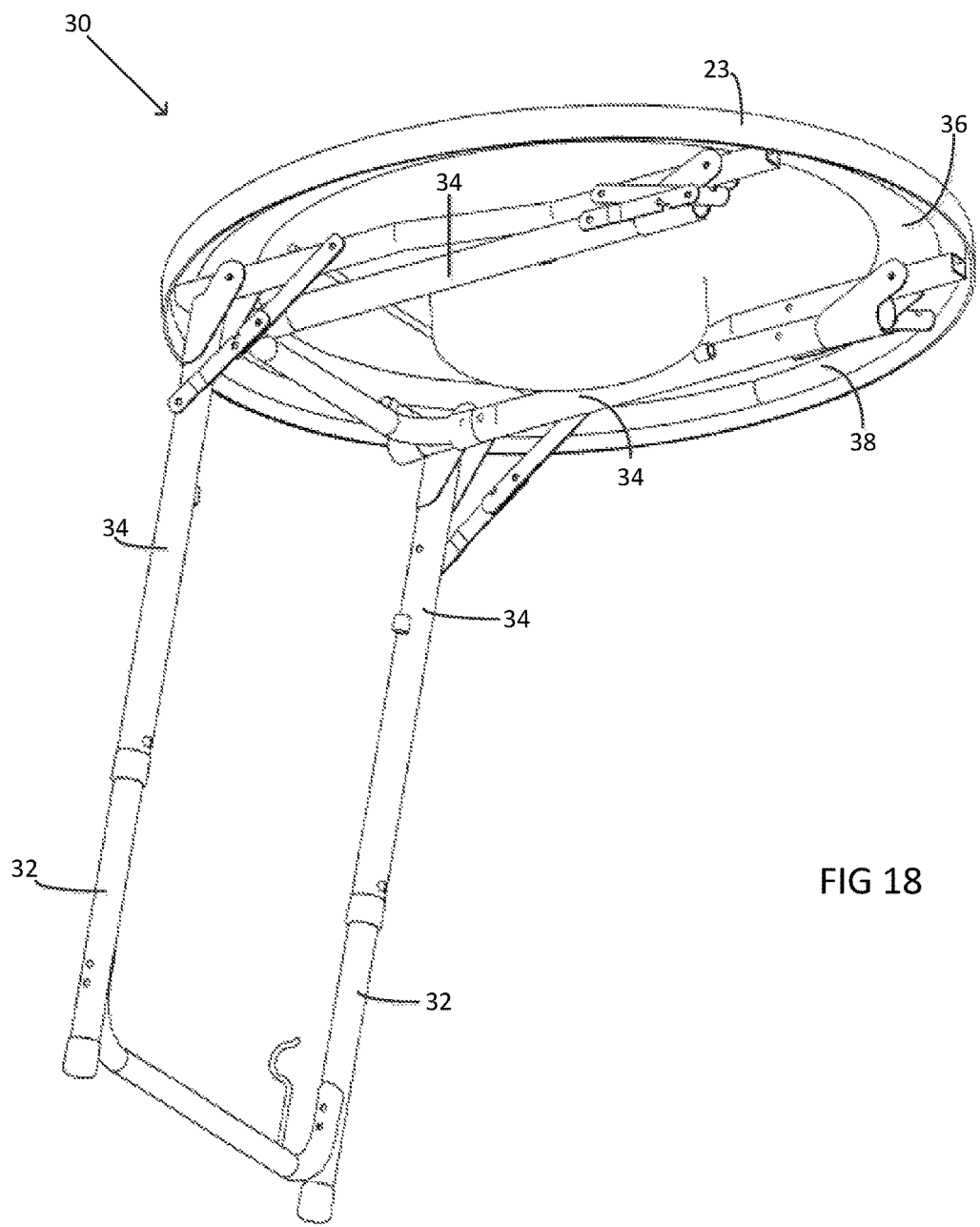
FIG. 18 depicts how the stand up stand collapses down into itself for easy storage and transport.

Illustration of the cooking device stand 12 in FIGS. 3B, 4, and 5, shows how the cooking device 10 is placed on top of the support arms 24 of the stand 12 to fit perfectly on the stand and be positioned so that the securing holes 26 in the support arms of the stand 12 line up with the holes 27 (FIG. 12) in the cooking device 10. FIG. 4 illustrates how the safety connection is made between the stand support arms 24 and the cooking device 10 by means of a wing nut screw 28 and in some embodiments, a quick connection locking device. This safety connection ensures the cooking device 10 will be locked to the stand 12 so that no independent movement between the stand 12 and the cooking device 10 will occur. FIGS. 13A, 13B, 13C and 18 of the stand-up/collapsible version of the cooking device 30 also illustrate how the secondary legs 32 telescope inside of the primary legs 34 which then fold neatly together against the said cooking device 30, FIGS. 13A, 13B, 13C showing the legs in an unfolded position, and FIG. 18 showing some of the legs in a folded position. The safety connection of the said cooking device 30 to the stand-up/collapsible stand 31 is the mechanical compression of the said cooking device flange 36 and/or the vertical flange 23 to the circular stand frame 38. This is unique in that there are no fasteners required, simply the said cooking device flange 36 presses onto the circular frame 38 creating a very sturdy and safe stand. This is illustrated in FIG. 18.

In FIGS. 3B, 4 and 5 the short cooking device stand 12 uses the embodiment method of quick release legs 40. The legs 40 and support arms 24 for the cooking device 10 are of the same structure. As shown in FIG. 5, the legs 40/support arms 24 of the cooking device 10 have quick assemble wing nuts 42 and screws 44, and in some embodiments of the device have quick connecting lock turning knobs. The leg/support arms (24, 40) are positioned over the holes 46 (FIG. 3B) in the burner ring 48 (FIGS. 3B, 4 and 5), and quickly attach by means of wing nuts 42 or a locking quick connection. All 3 legs assemble and disassemble in the same way very quickly so that the stand 12 of the cooking device has little set up and take down time.

The cooking device stand inside circumference c of the burner ring shown in FIG. 3B is larger than the outside dimension of the cooking device oil reservoir 16 (FIG. 4). This allows the burner stand section to "nest" within or allow the oil reservoir 16 of the cooking device 10 to sit inside the burner ring 48 resulting in the most efficient packing storing and best use of space. The quick release legs and nesting of the burner ring and the cooking device make the preferred embodiment of the device very portable and easy to store.

Figure 14:
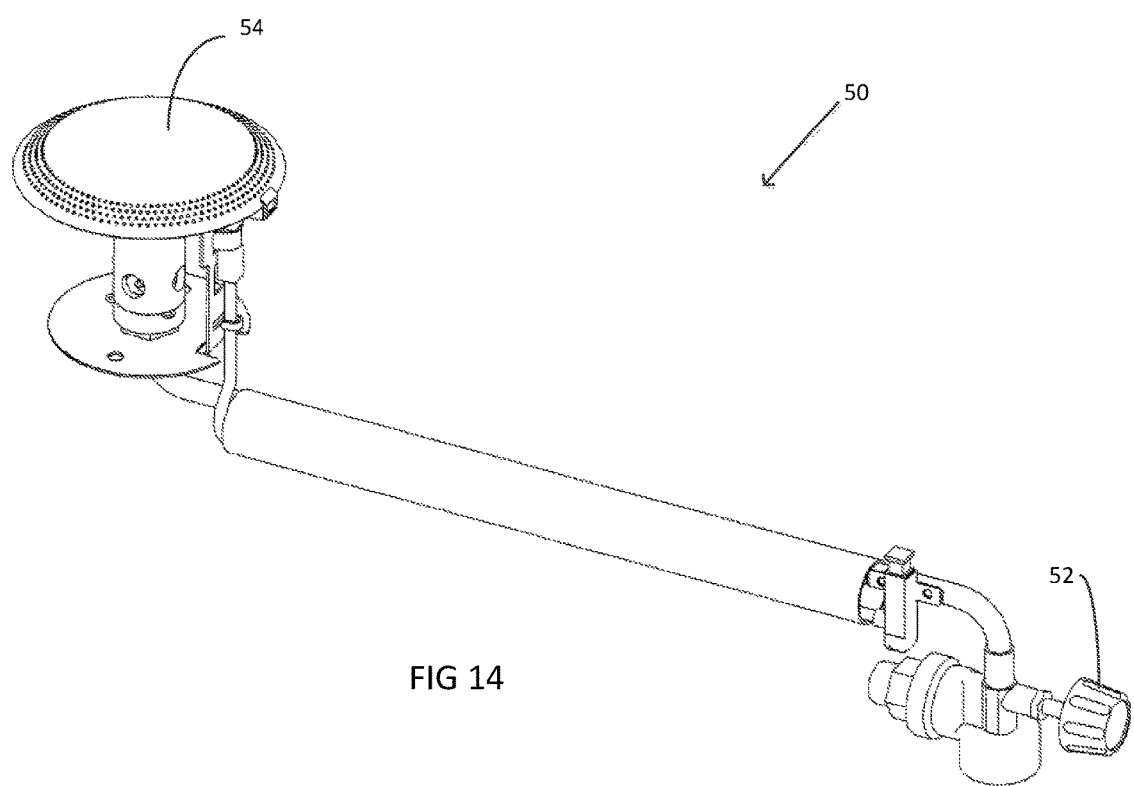
FIG. 14 is a detailed perspective of the burner.

In FIG. 14, the burner assembly 50 shows how the regulator 52 and the burner 54 are separate from each other and distanced apart. This safety step is to ensure the regulator 52 does not get hot and effect the normal function.

Figure 15:
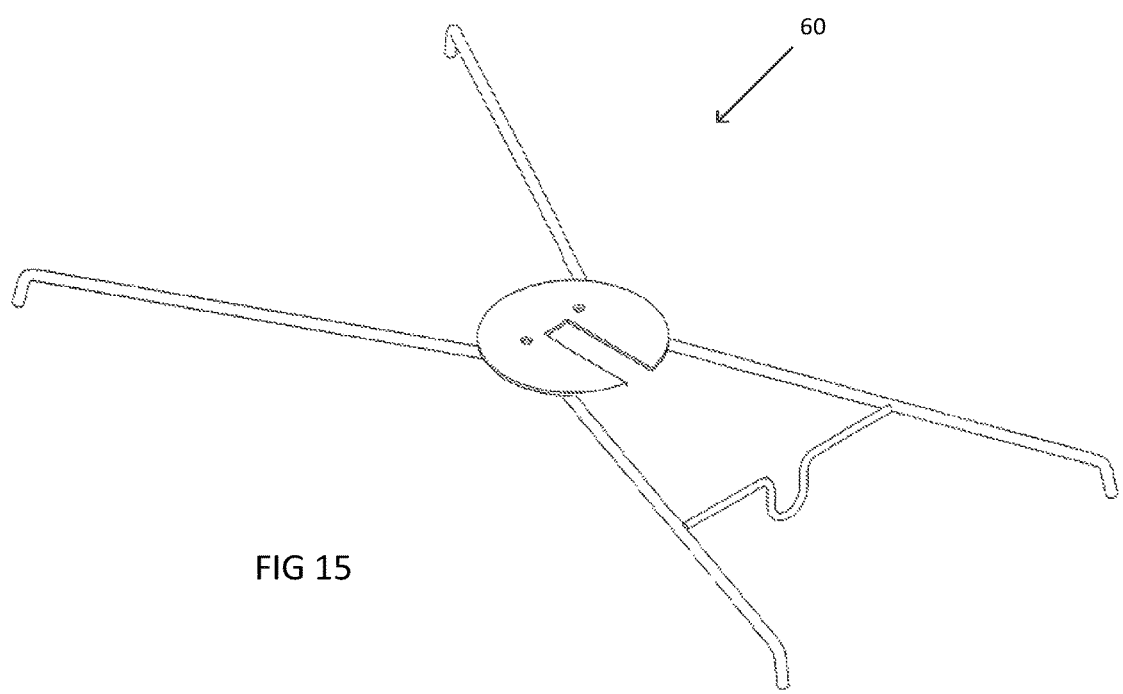
FIG. 15 is a detailed perspective of the burner support.

FIG. 15 is a detail of the burner support 60 which acts as a support member for the stand 31 (see FIGS. 13A, 13B, and 13C) and a support/connection for the burner assembly 50 to affix to.

Figure 16:
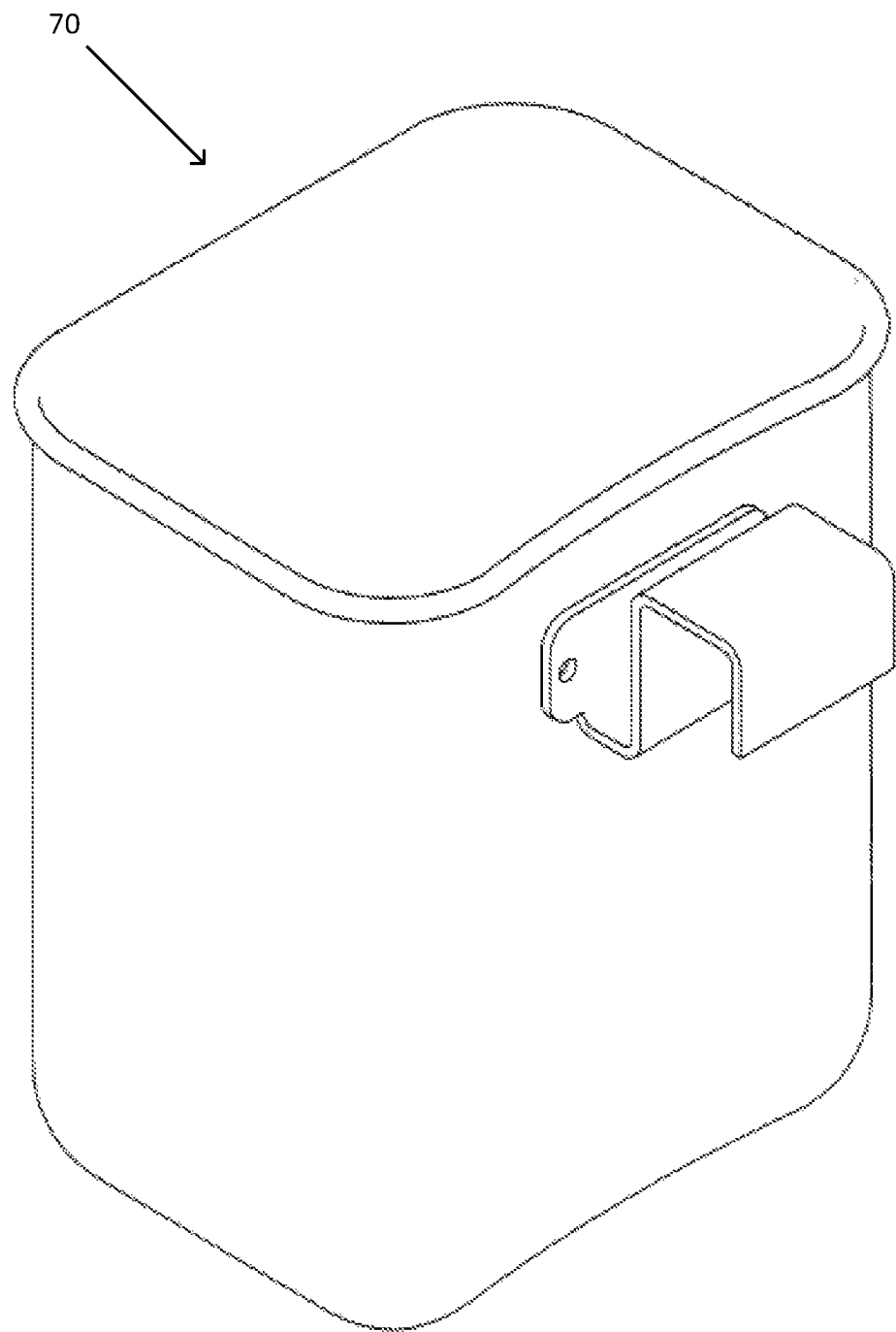
FIG. 16 illustrates an accessory for attachment to the frame ring.

FIG. 16 is an accessory utility holder 70 that attached to the frame ring 38 of the stand up stand 31 depicted in FIGS. 13A, 13B, and 13C, which has no fasteners and securely holds utensils and other accessories.

Figure 17:
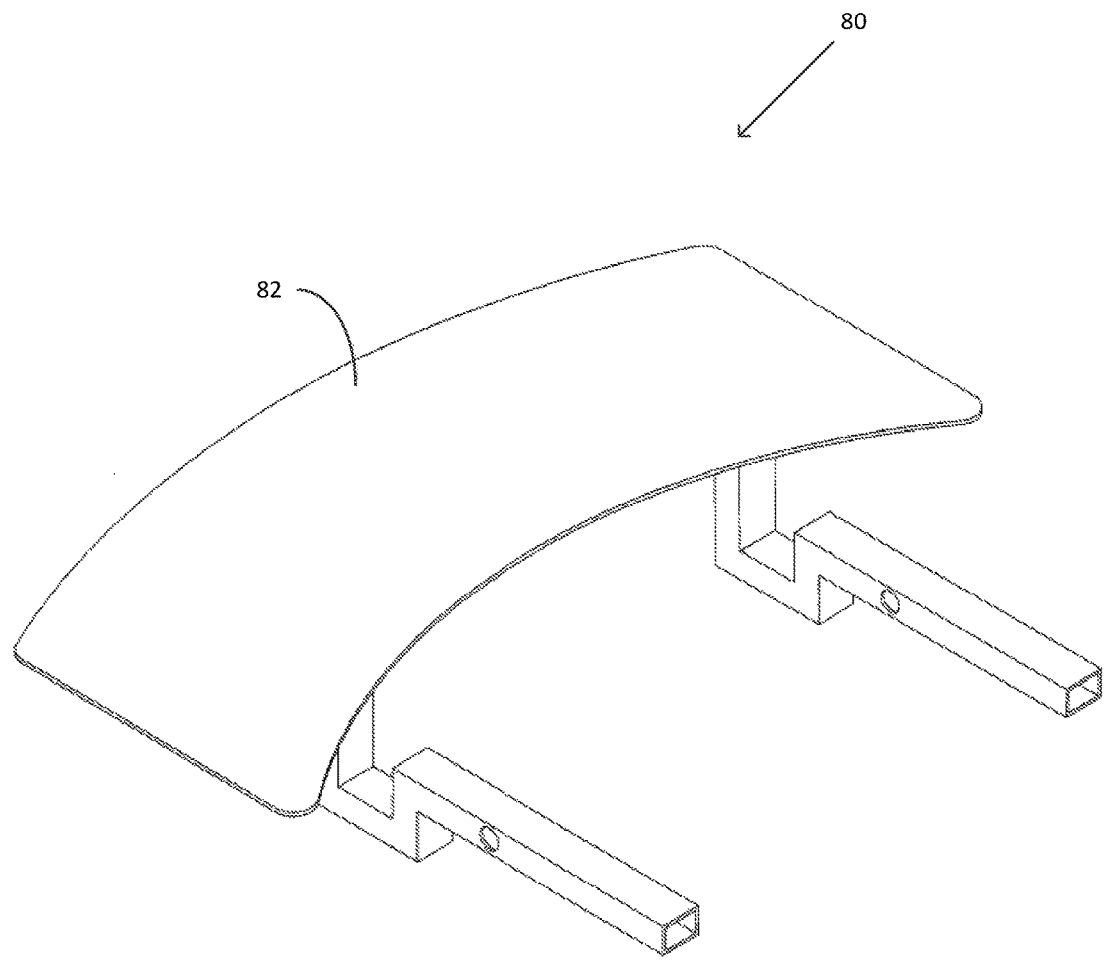
FIG. 17 illustrates another accessory for attachment to the frame ring.

FIG. 17 is an accessory shelf 80 that attaches to the frame ring 38 (see FIGS. 13A, 13B, and 13C) and provides a platform 82 for staging food and other accessories needed to food preparation.

FIG. 18 depicts how the legs (32, 34) telescope and collapse into the cooking device 30 itself and create an easy to "break-down" and transport appliance.

Figure 19:
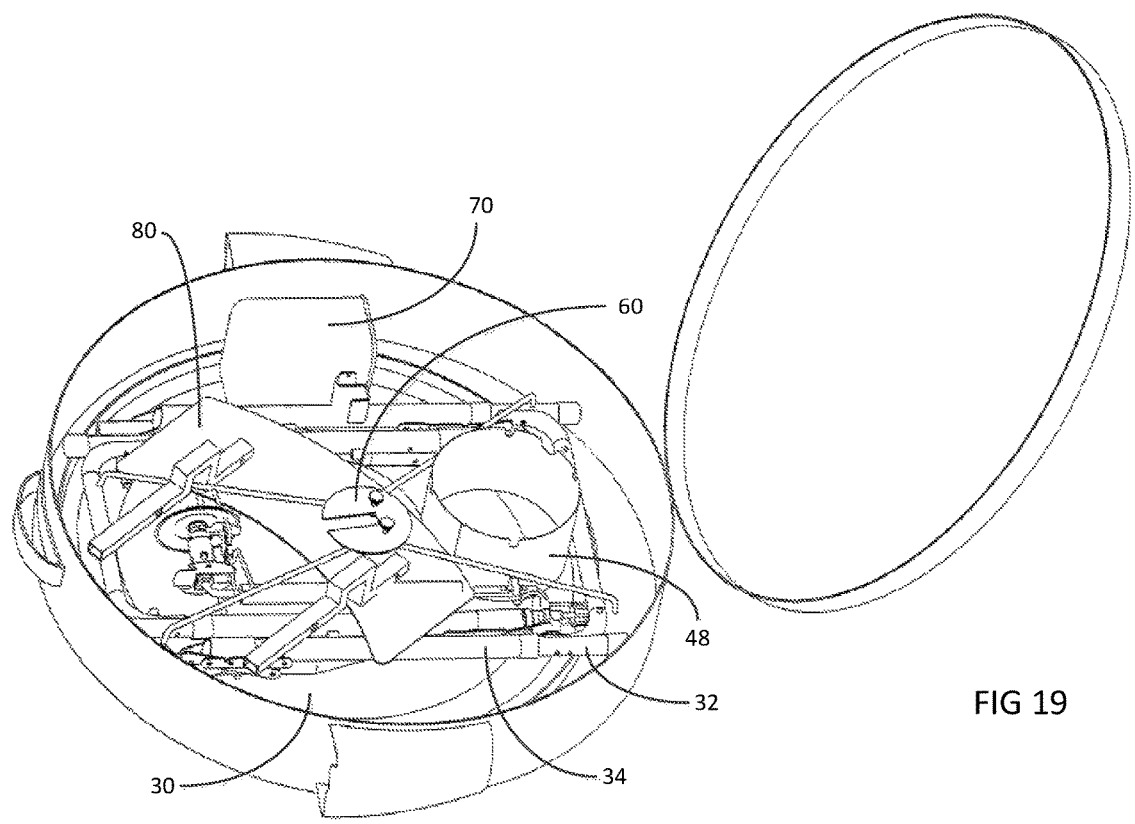
FIG. 19 is a detailed perspective of the cooking device parts and accessories packed, nested together for easy transport and storage.

FIG. 19 shows how the appliance of FIG. 18 tightly nests together for easy transport and storage.

As in FIGS. 6-12 the cooking device design further comprises a safety plate 14 in cases where the cooking device may be used with a stand not sold with the cooking device.

It is understood that there exists many stand/burners currently in the marketplace and in many homes. It is logical that someone will want to use the cooking device with their own, different stand/burner, instead of buying a duplicate stand/burner. We have designed a safety plate 14 that addresses the safe use of the said cooking device with a stand/burner from another manufacturer.

Figure 10:
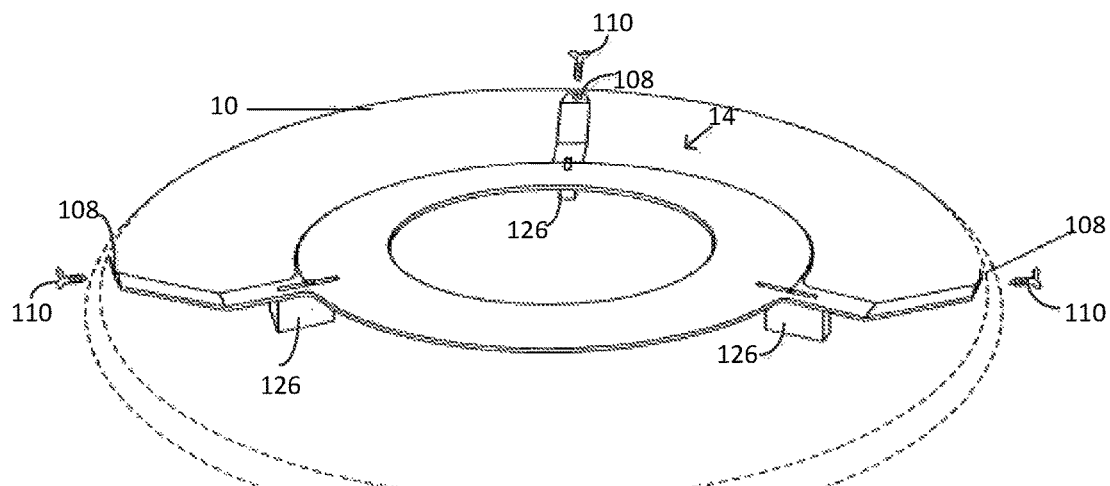
FIG. 10 is a front/top perspective of the said cooking device superimposed and connected on the safety stand plate.
Figure 11:
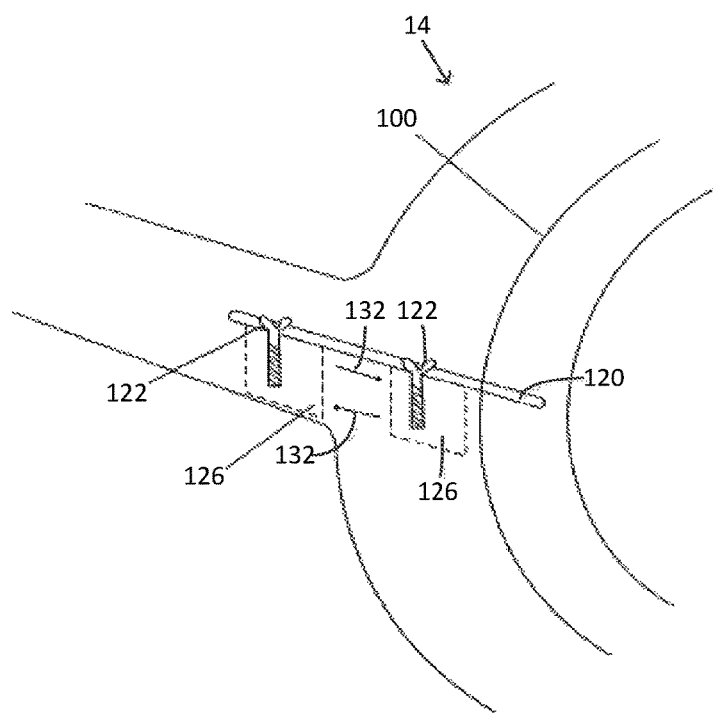
FIG. 11 is an enlarged perspective of the adjustable bracing mechanism on the safety stand plate of FIG. 10.
Figure 12:
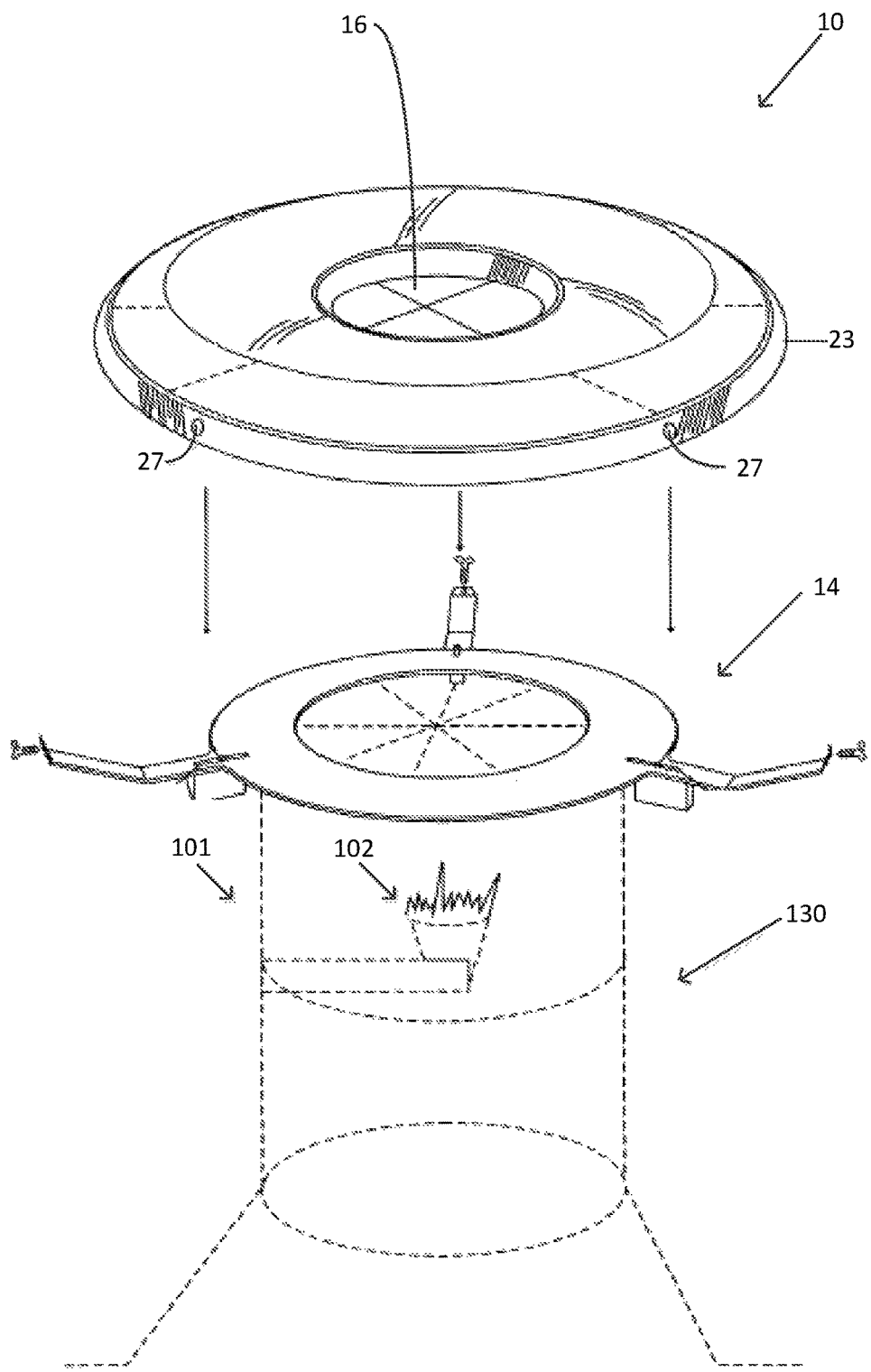
FIG. 12 is an exploded superimposed perspective displaying how the said cooking device connects to the safety plate which connects to an existing burner stand.
Figure 13A:
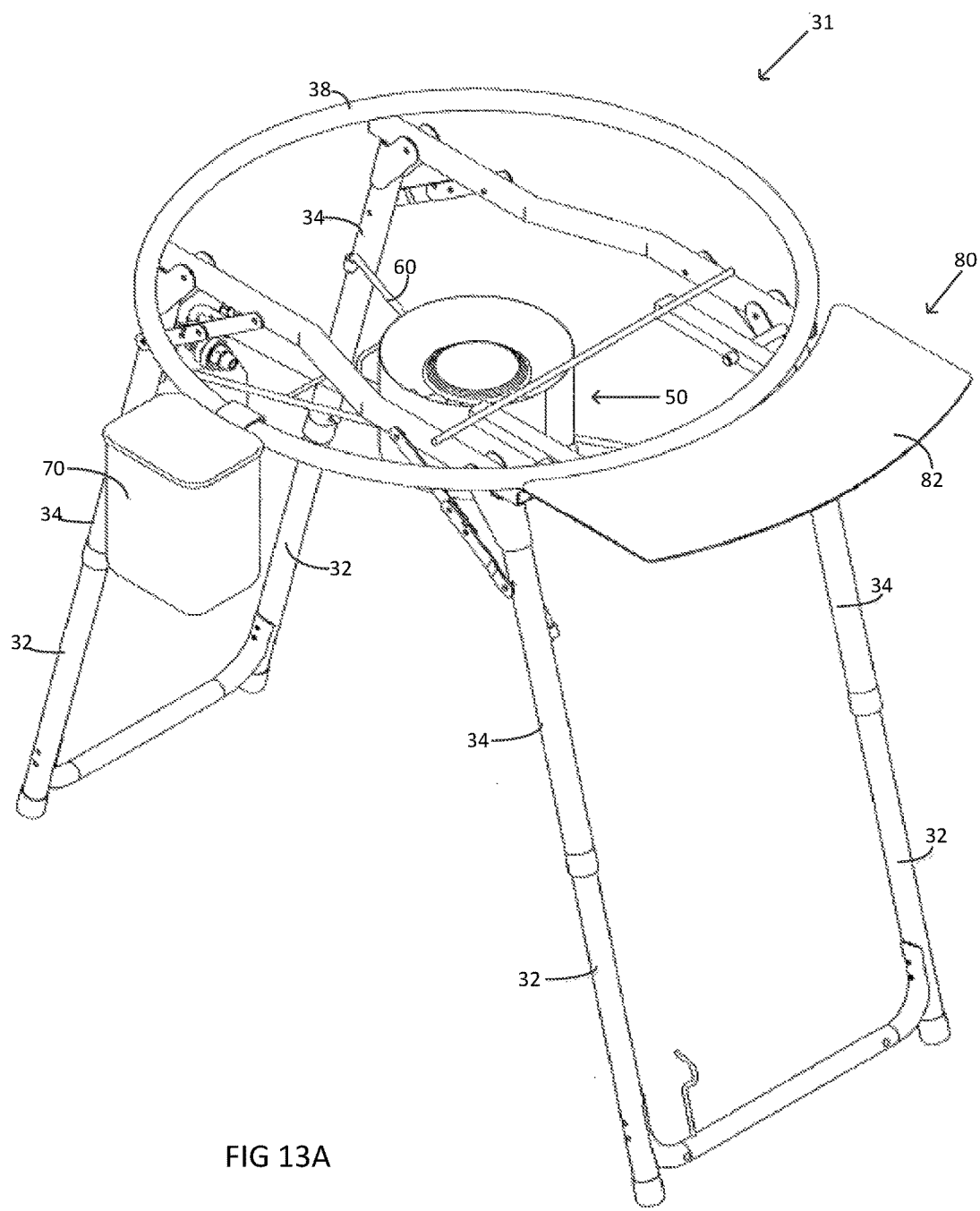
FIG. 13A is a detailed perspective of the stand-up stand with frame ring.
Figure 13B:
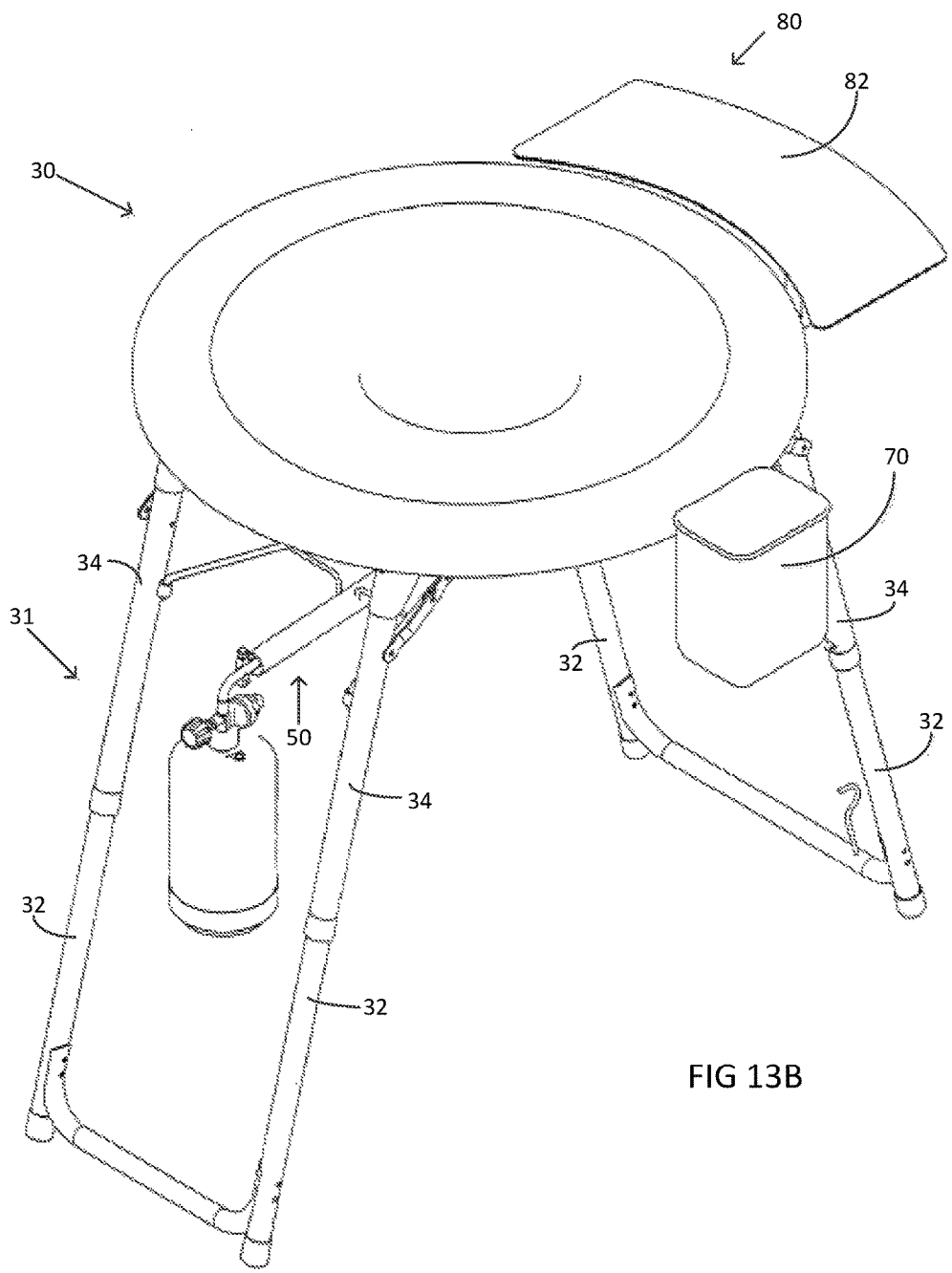
FIG. 13B is a further detailed perspective of the stand-up stand of FIG. 13A with the cooking device attached thereto.
Figure 13C:
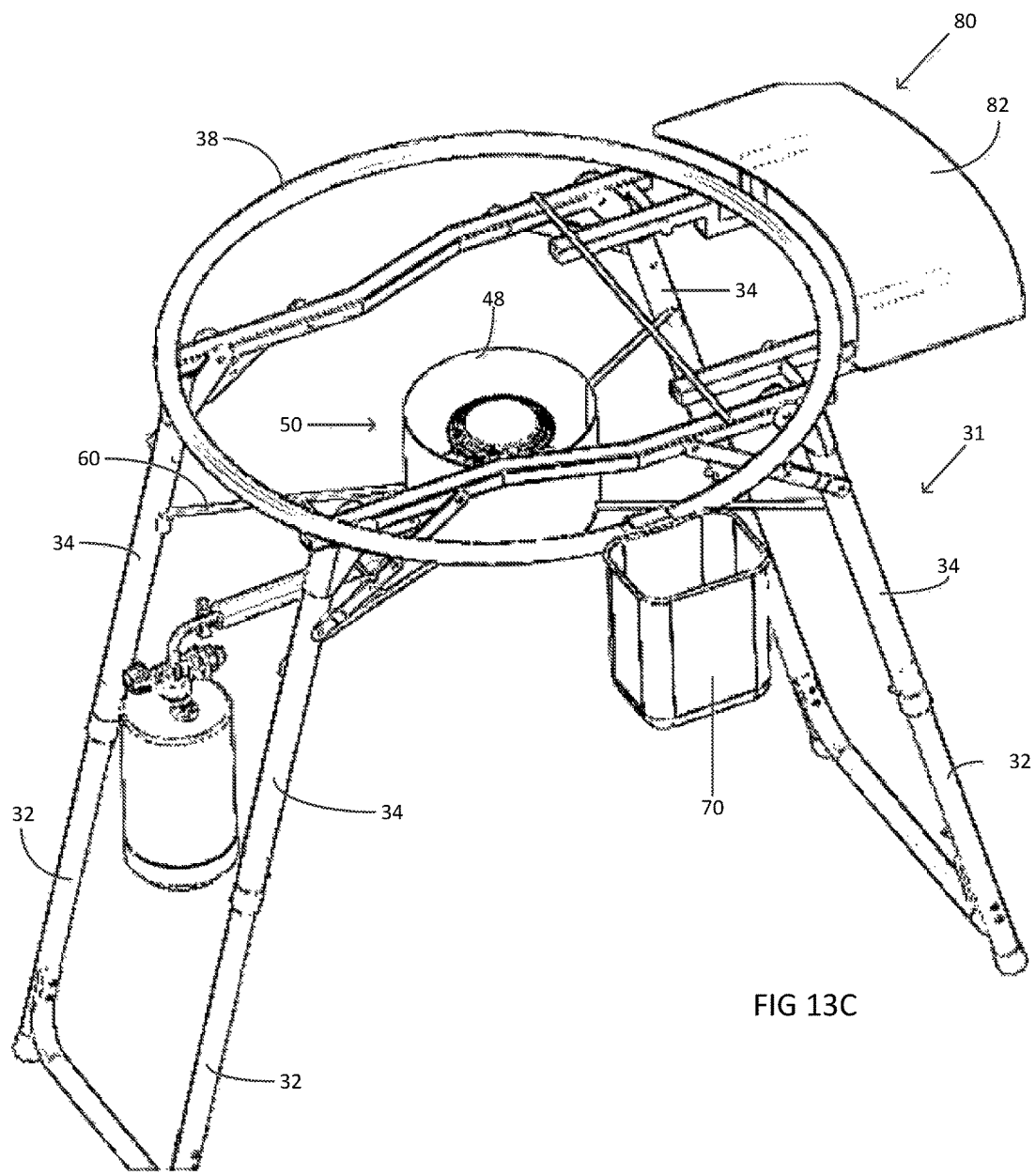
FIG. 13C is a further detailed perspective of the stand-up stand with frame ring of FIG. 13A.

As illustrated in FIGS. 6-12 the safety device 14 has a flat circular plate 100 that rests on the existing burner 102 as in FIG. 12. The support arms 104 of the safety plate are designed to extend up and hold the cooking device 10 at a specific distance from the top of the existing burner stand. The safety support arms 104 can be attached to the circular safety plate 100 by means of welding, fasteners or other connections, to include one piece construction. The flat safety plate 100 has a hole 106 in the middle to allow for the heat from the burner to pass through the safety plate 100 and heat up the bottom of the oil reservoir 16 of the said cooking device 10. This hole 106 is approximately 11 inches in diameter ($d_3$) but can be made larger or smaller depending on the size of the safety plate 100.

The support arms 104 comprise a safety connection flange 108 at the upper end of the support arm 104 that lines up with the holes 27 in the cooking device 10 to be safely secured together by means of a quick connection screw 110, as illustrated in FIG. 10. This connection "locks" the safety plate 100 to the cooking device 10.

In completing the final necessary connection of the safety plate 100 to the existing stand 101/burner 102, the safety plate design further comprises 3 adjustable safety connections located on the underside of the circular safety plate 100, as illustrated in FIGS. 6-12.

As illustrated in FIGS. 6-12, there exists an open slot 120 in which the screw 122 holding the bracing block 126 is able to slide easily into the correct position to be tightened. The open slot 120 which carries the adjustable bracing block 126 is ⅛ inch in width and 3 inches long. The bracing block is ¾ inch in width by 2 inches long by 1 inch in height. The bracing block 126 can be oriented in any way to accommodate the outer wall 130 of the existing stand 101/burner 102 as illustrated in FIG. 12.

As in FIG. 11, when the safety plate 100 is positioned on top of an existing burner, the adjustable safety bracing block 126 slides up against the existing burner wall (as indicated by the arrows 132). The bracing block 126 is held into position while the tightening screw 122 is tightened so that the bracing block 126 is fixed into position against the existing stand/burner wall. When all 3 adjustable safety bracing blocks 126 are positioned firmly against the existing stand/burner ring or outside wall, the adjustable bracing blocks 126 are checked and retightened by means of the quick connection screws or turning knob. This ensures a firm connection of the safety plate 100 to the existing stand/burner.

The above FIGS. 1-12 are to be illustrative and are not intended to limit the scope of the invention, it being intended that all equivalents thereof be included in the scope of the appended claims.

What is claimed is:

1. A cooking device comprising:
a cooking structure, the cooking structure comprising:
an oil reservoir positioned in a center of the cooking structure and having an open top and an interior volume defined by a bottom surface and a closed side extending from the bottom surface;
a drain flange positioned above the oil reservoir, surrounding the oil reservoir, and abutting the closed side of the oil reservoir, the drain flange being pitched down towards the oil reservoir; and
a food holding area surrounding an outer edge of the drain flange, the food holding area having a pitch relative to the oil reservoir that is less than a pitch of the drain flange relative to the closed side of the oil reservoir.

2. The cooking device of claim 1, further comprising a stand comprising a plurality of legs releasably connected to the cooking structure, and wherein at least one of the plurality of legs is collapsible.

3. The cooking device of claim 2, wherein the plurality of legs are collapsible and foldable.

4. The cooking device of claim 2, wherein the stand comprises a frame ring, wherein the cooking structure is round, and wherein the frame ring is configured to couple to an underside of the cooking structure via a compression fit.

5. The cooking device of claim 4, wherein the compression fit is between the frame ring and a vertical flange extending from an outer edge of the food holding area.

6. The cooking device of claim 4, further comprising a utensil holder supported on the frame ring by the compression fit between the frame ring and the cooking structure.

7. The cooking device of claim 2, further comprising a vertical flange extending from an outer edge of the food holding area, and wherein the stand releasably couples to the vertical flange.

8. The cooking device of claim 1, further comprising a burner assembly having a burner ring, a burner disposed within the burner ring, and a burner regulator positioned at a distance from the burner.

9. The cooking device of claim 8, further comprising a stand having a plurality of legs, and a burner support coupled to the stand and configured to support the burner assembly.

10. The cooking device of claim 1, further comprising a safety plate configured to couple the cooking structure to a cooking stand.

11. The cooking device of claim 10, wherein the safety plate comprises a plurality of support arms for supporting the cooking structure.

12. The cooking device of claim 11, wherein each of the support arms comprises an upwardly extending support flange configured to couple to a vertical flange extending from an outer edge of the food holding area.

13. The cooking device of claim 11, further comprising a block coupled to each of the support arms, each of the blocks being configured to rest against a burner wall.

14. The cooking device of claim 13, wherein each of the support arms comprises a slot configured for adjusting a position of the block relative to the support arm.

15. The cooking device of claim 10, wherein the safety plate comprises a central opening configured to receive the oil reservoir.

16. The cooking device of claim 1, wherein the bottom surface of the oil reservoir is a horizontal surface, and wherein the closed side of the oil reservoir extends vertically from the bottom surface of the oil reservoir.

17. A cooking device comprising:
   a cooking structure, the cooking structure comprising:
      an oil reservoir positioned in a center of the cooking structure and having an open top and an interior volume defined by a bottom surface and a closed side extending from the bottom surface; and
      a drain flange positioned above the oil reservoir, surrounding the oil reservoir and abutting the closed side of the oil reservoir, the drain flange having a pitch down towards the oil reservoir; a food holding area surrounding an outer edge of the drain flange, the food holding area having a pitch relative to the oil reservoir that is less than a the pitch of the drain flange relative to the closed side of the oil reservoir; and
   a safety plate, the safety plate comprising a plurality of support arms for supporting the cooking structure, a central opening configured to receive the oil reservoir, a block coupled to each of the support arms, each of the blocks being configured to rest against a burner wall, and a slot disposed in each of the support arms, each of the slots being configured for adjusting a position of the block relative to the support arm.

18. The cooking device of claim 17, wherein each of the support arms comprises an upwardly extending support flange configured to couple to a vertical flange extending from an outer edge of the cooking structure.

19. The cooking device of claim 17, wherein the bottom surface of the oil reservoir is a horizontal surface, and wherein the closed side of the oil reservoir extends vertically from the bottom surface of the oil reservoir.

* * * * *

UNITED STATES PATENT AND TRADEMARK OFFICE
CERTIFICATE OF CORRECTION

PATENT NO. : 9,737,170 B2
APPLICATION NO. : 12/653147
DATED : August 22, 2017
INVENTOR(S) : Bizal et al.

Page 1 of 2

It is certified that error appears in the above-identified patent and that said Letters Patent is hereby corrected as shown below:

In the Specification

Column 1, Line 14: "deep fry, fly and steam" should read --deep fry, fry and steam--

Column 1, Line 26: "years that flying outdoors" should read --years that frying outdoors--

Column 1, Line 33: "many flying kitchen tools," should read --many frying kitchen tools,--

Column 1, Line 34: "previous deep flying inventions" should read --previous deep frying inventions--

Column 1, Line 47: "are flying food using flat type griddle or flying" should read --are frying food using flat type griddle or frying--

Column 1, Line 51: "function oil flying/" should read --function oil frying/--

Column 1, Line 55: "Many flying pans" should read --Many frying pans--

Column 2, Line 3: "primary fryer/deep flyer or" should read --primary fryer/deep fryer or--

Column 2, Line 19: "The existing flying" should read --The existing frying--

Column 2, Line 21: "approach to flying/steaming" should read --approach to frying/steaming--

Column 2, Line 22: "deep flying food in oil" should read --deep frying food in oil--

Column 2, Line 50: "flying process." should read --frying process.--

Column 3, Line 1: "cumbersome deep flyers, pans," should read --cumbersome deep fryers, pans,--

Signed and Sealed this
Twenty-seventh Day of November, 2018

Andrei Iancu
*Director of the United States Patent and Trademark Office*

CERTIFICATE OF CORRECTION (continued)
U.S. Pat. No. 9,737,170 B2

Column 3, Line 6: "for deep flyers, burners," should read --for deep fryers, burners,--

Column 3, Line 29: "after the flying and deep flying food in a" should read --after the frying and deep frying food in a--

Column 5, Line 41: "used for flying, heating," should read --used for frying, heating,--

Column 5, Line 51: "oil used for flying/deep frying." should read --oil used for frying/deep frying.--